(12) United States Patent
Yamamoto

(10) Patent No.: US 9,573,419 B2
(45) Date of Patent: Feb. 21, 2017

(54) WHEEL BEARING APPARATUS AND ITS MANUFACTURING METHOD

(71) Applicant: NTN Corporation, Osaka-shi (JP)

(72) Inventor: Kazunari Yamamoto, Iwata (JP)

(73) Assignee: NTN Corporation, Osaka-shi (JP)

( * ) Notice: Subject to any disclaimer, the term of this patent is extended or adjusted under 35 U.S.C. 154(b) by 28 days.

(21) Appl. No.: 14/518,208

(22) Filed: Oct. 20, 2014

(65) Prior Publication Data

US 2015/0036958 A1 Feb. 5, 2015

Related U.S. Application Data

(63) Continuation of application No. PCT/JP2013/061544, filed on Apr. 18, 2013.

(30) Foreign Application Priority Data

Apr. 20, 2012 (JP) .................. 2012-096281

(51) Int. Cl.
*F16C 13/00* (2006.01)
*B60B 27/00* (2006.01)
(Continued)

(52) U.S. Cl.
CPC ............. *B60B 27/0005* (2013.01); *B21K 1/40* (2013.01); *B21K 1/76* (2013.01); *B21K 23/04* (2013.01); *F16C 19/08* (2013.01); *F16C 33/64* (2013.01); *F16C 43/04* (2013.01); *F16C 19/186* (2013.01); *F16C 33/60* (2013.01); *F16C 2220/46* (2013.01); *F16C 2240/54* (2013.01); *F16C 2326/02* (2013.01)

(58) Field of Classification Search
CPC ..... F16C 19/185; F16C 19/186; F16C 19/187; F16C 19/08; F16C 19/28; F16C 19/385; F16C 19/386; F16C 33/64; F16C 43/04; F16C 2220/46; F16C 2326/02; F16C 2240/54; B21K 1/40; B21K 23/04
See application file for complete search history.

(56) References Cited

U.S. PATENT DOCUMENTS

2007/0269155 A1* 11/2007 Mori ...................... B60B 27/00
384/544
2009/0263065 A1 10/2009 Kobayashi et al.
(Continued)

FOREIGN PATENT DOCUMENTS

JP 2005-335455 12/2005
JP 2007-071352 3/2007
(Continued)

*Primary Examiner* — James Pilkington
(74) *Attorney, Agent, or Firm* — Harness, Dickey & Pierce, P.L.C.

(57) ABSTRACT

A wheel bearing apparatus has an outer member, an inner member and double row rolling elements freely rollably contained between double row inner raceway surfaces and outer raceway surfaces of the inner member and the outer member. A plurality of bolt insertion bores, that fastening bolts pass through to fasten to the knuckle, are formed on the body mounting flange at plurality of positions circumferentially along the body mounting flange. The outer member is previously formed by hot forging. A seating surface for the fastening bolts is formed on an outboard-side surface of the body mounting flange by cold forging.

6 Claims, 7 Drawing Sheets

(51) Int. Cl.
*F16C 33/64* (2006.01)
*B21K 1/40* (2006.01)
*B21K 1/76* (2006.01)
*B21K 23/04* (2006.01)
*F16C 19/08* (2006.01)
*F16C 43/04* (2006.01)
*F16C 33/60* (2006.01)
*F16C 19/18* (2006.01)

(56) References Cited

U.S. PATENT DOCUMENTS

2010/0011582 A1* 1/2010 Kobayashi .............. F16C 33/64
 29/898.066
2010/0209034 A1 8/2010 Masuda et al.

FOREIGN PATENT DOCUMENTS

| | | | |
|---|---|---|---|
| JP | 2010-051981 | | 3/2010 |
| JP | 2010-214467 | | 9/2010 |
| JP | 2012-076481 | | 4/2012 |
| WO | WO2008/018439 | | 2/2008 |
| WO | WO2012/128278 | * | 9/2012 |

* cited by examiner

WHEEL BEARING APPARATUS AND ITS MANUFACTURING METHOD

CROSS-REFERENCE TO RELATED APPLICATIONS

This application is a continuation of International Application No. PCT/JP2013/061544, filed Apr. 18, 2013, which claims priority to Japanese Application No. 2012-096281, filed Apr. 20, 2012. The disclosures of the above applications are incorporating herein by reference.

FIELD

The present disclosure relates to a wheel bearing apparatus and its manufacturing method and, more particularly, to a wheel bearing apparatus and its manufacturing method that improves the blank yield and reduces manufacturing cost while reducing the number of processing steps.

BACKGROUND

In general, wheel bearing apparatii is classified into a so-called first, second, third and fourth generation type. In a first generation type, the wheel bearing includes double row angular-contact ball bearings fit between the knuckle and the wheel hub. In a second generation type, a body mounting flange or a wheel mounting flange is integrally formed on the outer circumference of an outer member. In a third generation type, one of the inner raceway surfaces is directly formed on the outer circumference of the wheel hub. In a fourth generation type, the inner raceway surfaces are directly formed on the outer circumferences, respectively, of the wheel hub and the outer joint member of a constant velocity universal joint.

Recently, there has been a strong desire to improve fuel consumption in view of resource savings or anti-pollution. Reduction of weight in automobile parts, particularly in a wheel bearing apparatus, has been noticed. In response of these demands, there is a strong desire to reduce the weight of the wheel bearing apparatus while maintaining its strength and rigidity. A wheel bearing apparatus 50 has been proposed, as shown in FIG. 5, that can solve these objectives.

The wheel bearing apparatus 50 is a third generation type used for a driven wheel. It has a wheel hub 51, an inner ring 52, an outer member 53, and double row balls 54, 54. The wheel hub 51 has, on its one end, an integrated wheel mounting flange 55. An inner raceway surface 51a is formed on the outer circumference of the wheel hub 51. A cylindrical portion 51b axially extends from the inner raceway surface 51a. Furthermore, hub bolts 55a are secured equidistantly along the periphery of the wheel mounting flange 55.

The inner ring 52 is formed with an inner raceway surface 52a on its outer circumference. The inner ring 52 is press-fit onto the cylindrical portion 51b of the wheel hub 51. Axial falling out of the inner ring 52, from the wheel hub 51, is prevented by plastically deforming an end of the cylindrical portion 51b of the wheel hub 51. This forms a caulked portion 51c.

The outer member 53 is formed with a body mounting flange 53b on its outer circumference. The body mounting flange 53b is mounted on a knuckle (not shown). The inner circumference of the outer member includes double row outer raceway surfaces 53a, 53a. The double row balls 54, 54 are rollably contained between the double row outer raceway surfaces 53a, 53a and the double row inner raceway surfaces 51a, 52a.

As shown in FIG. 6, the body mounting flange 53b, of the outer member 53, is formed with a plurality of bolt insertion bores 56, 57. Bolts to be fastened to a body of a vehicle are inserted through the bores 56, 57. The total number of the bolt insertion bores 56, 57 is four. Two bores 56 are arranged at an upper portion, at a position below the uppermost position of the body mounting flange 53b, at an angle of about 60° of the body mounting flange 53b. The other two bores 57 are arranged at a lower portion positioned above the lowermost position of the body mounting flange 53b by an angle of about 45°.

The thickness of upper and lower portions 58, that are positioned between two upper bolt insertion bores 56, 56 and between two lower bolt insertion bores 57, 57, is the same as a thickness of the peripheral portion 59 around the bolt insertion bores 56, 57. The thickness of the upper and lower portions 58 is made thicker than the fore and aft portions 60.

When the total number of the bolt insertion bore is three, two of them are arranged on both the upper sides of the uppermost portion of the body mounting flange 53b. One of them is arranged at a position near the lowermost portion of the body mounting flange 53b. The thickness of the peripheral portion around the bolt insertion bores is not thinned. The thickness of the peripheral portion around the lower bolt insertion bore is thinner than those of the peripheral portions around the two upper bolt insertion bores.

The wheel bearing apparatus 50 receives vertical loads, lateral loads and fore and aft loads. The largest moment is applied to the upper and lower portions 58 of the body mounting flange 53b when the lateral load is applied to the wheel bearing apparatus 50. Accordingly, the upper and lower portions 58 of the body mounting flange 53b are formed thicker. This improves the strength and rigidity of the body mounting flange 53b. On the other hand, the moment applied to the fore and aft portions 60 is relatively small. Thus, the fore and aft portions 60 do not require the same strength and rigidity as those of the upper and lower portions 58. Thus, it is possible to form the fore and aft portions 60 relatively thinner than the upper and lower portions 58 to reduce the weight of the body mounting flange 53b. This balances the strength, rigidity and light weight at a higher level. See JP 2007-71352 A.

However, in the prior art wheel bearing apparatus 50, the bolt insertion bores 56, 57 are simple threadless insertion bores and not tapped bores. Thus, the outer member 53 can be secured to the knuckle by inserting fastening bolts (not shown) through the bolt insertion bores 56, 57 from the outboard-side, the wheel mounting flange 55 side. The fastening bolts are secured to tapped bores in the knuckle. In this case, a bolt seating surface 62 is required on the outboard-side surface 61 of the body mounting flange 53b, as shown in FIG. 7, in order to improve the mounting accuracy.

As shown in FIG. 8, the outer member bolt seating surface 62 is formed by lathe turning, shown by a dot-and-dash line, after hot forging, shown by two-dot chain line, and bored by using a boring jig such as a drill. A chamfered portion 63 is formed on an inboard-side surface 64 of the body mounting flange 53b. A pilot portion 65 and outer raceway surfaces 53s etc. are formed by lathe turning.

As described above, the bolt seating surface 62 is formed by lathe turning. However, a re-chucking operation of the outer member 53 is required to carry out the lathe turning of the bolt seating surface 62. Thus, problems occur such as increasing the number of processing steps and cycle time and therefore the manufacturing cost.

SUMMARY

It is therefore an object of the present disclosure to provide a wheel bearing apparatus and a manufacturing method that improves blank yield and reduces manufacturing cost while reducing the number of process steps.

To achieve the object of the present disclosure, a wheel bearing apparatus comprises an outer member formed with a body mounting flange on its outer circumference. The body mounting flange is mounted on a knuckle. The outer member inner circumference includes double row outer raceway surfaces. An inner member is formed with double row inner raceway surfaces on its outer circumference. The double row inner raceway surfaces oppose, respectively, one of the double row outer raceway surfaces. Double row rolling elements are freely rollably contained between the double row inner raceway surfaces and the outer raceway surfaces of the inner member and the outer member. A plurality of bolt insertion bores are formed on the body mounting flange at a plurality of positions circumferentially along the body mounting flange. The outer member is previously formed by hot forging. A seating surface for the fastening bolts is formed by cold forging on an outboard-side surface of the body mounting flange.

The wheel bearing apparatus of the second to fourth generation types comprise an outer member formed with a body mounting flange on its outer circumference. The body mounting flange is to be mounted on a knuckle. The outer member inner circumference includes double row outer raceway surfaces. A plurality of bolt insertion bores are formed on the body mounting flange at a plurality of positions circumferentially along the body mounting flange. The outer member is previously formed by hot forging. A seating surface for the fastening bolts is formed by cold forging on an outboard-side surface of the body mounting flange. Thus, it is possible to assure a desirable finishing accuracy and to eliminate the lathe turning process of the outboard-side surface of the body mounting flange. Accordingly, it is possible to provide a wheel bearing apparatus that improves blank yield and reduces manufacturing cost while reducing the number of process steps.

The bolt insertion bores of the body mounting flange are formed by cold forging. This makes it possible to eliminate a boring step by machining process. Thus, this further reduces manufacturing cost while reducing the number of process steps.

A chamfered portion is formed on an outboard-side circumferential edge of each bolt insertion bore. The chamfered portions are formed by cold forging. This further reduces the manufacturing cost while reducing the number of process steps.

The surface roughness of the outboard-side surface of the body mounting flange is set to Ra 6.3 or less. This prevents inclination of the fastening bolts and improves the mounting accuracy.

A method for manufacturing a wheel bearing apparatus comprising an outer member formed with a body mounting flange on its outer circumference. The outer member includes an inner circumference with double row outer raceway surfaces. An inner member is formed with double row inner raceway surfaces on its outer circumference. The double row inner raceway surfaces oppose, respectively, one of the double row outer raceway surfaces. Double row rolling elements are freely rollably contained between the double row inner raceway surfaces and the outer raceway surfaces of the inner member and the outer member. The method comprises steps of forming a plurality of bolt insertion bores on the body mounting flange at a plurality of positions circumferentially along the body mounting flange. Previously forming the outer member by hot forging. Forming a seating surface for the fastening bolts on an outboard-side surface of the body mounting flange by cold forging. This provides a wheel bearing apparatus that improves the blank yield and reduces manufacturing cost while reducing the number of process steps.

The bolt insertion bores of the body mounting flange are formed by cold forging. This further reduces manufacturing cost while reducing the number of process steps.

A plurality of the bolt insertion bores are simultaneously formed by cold forging using a boring jig under a condition where a supporting jig is positioned on the outermost contour of the body mounting flange. This improves not only the dimensional accuracy of the bolt insertion bores but the accuracy of relative positions of the bolt insertion bores.

According to the wheel bearing apparatus of the present disclosure, it comprises an outer member formed with a body mounting flange on its outer circumference. The body mounting flange is to be mounted on a knuckle. The outer member inner circumference includes double row outer raceway surfaces. An inner member is formed with inner raceway surfaces on its outer circumference. The double row inner raceway surfaces oppose, respectively, one of the double row outer raceway surfaces. Double row rolling elements are freely rollably contained between the double row inner raceway surfaces and the outer raceway surfaces of the inner member and the outer member. A plurality of bolt insertion bores are formed on the body mounting flange at a plurality of positions circumferentially along the body mounting flange. Fastening bolts to be fastened to the knuckle are inserted through the bores. The outer member is previously formed by hot forging. A seating surface for the fastening bolts is formed by cold forging on an outboard-side surface of the body mounting flange. Thus, it is possible to provide a wheel bearing apparatus that can improve blank yield and reduce manufacturing cost while reducing the number of process steps.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

A wheel bearing apparatus includes an outer member with a body mounting flange formed on its outer circumference. The body mounting flange is to be mounted on a knuckle. The outer member inner circumference includes double row outer raceway surfaces. An inner member includes a wheel hub and an inner ring. The wheel hub is integrally formed, on its one end, with a wheel mounting flange. The wheel hub outer circumference includes one inner raceway surface that opposes one of the double row outer raceway surfaces. A cylindrical portion axially extends from the wheel mounting flange. The inner ring is press-fit onto the cylindrical portion of the wheel hub. The inner ring outer circumference includes the other inner raceway surface that opposes the other double row outer raceway surfaces. Double row rolling elements are freely rollably contained, via cages, between the inner raceway surfaces of the inner member and the outer raceway surfaces of the outer member. A plurality of bolt insertion bores are formed on the body of the mounting flange at plurality of positions circumferentially along the body mounting flange. Fastening bolts fastened to the knuckle are inserted into the bores. The outer member is previously formed by hot forging. A seating surface for the fastening bolts are formed by cold forging on an outboard side surface of the body mounting flange and the surface of the bolts insertion bores.

Figure 1:
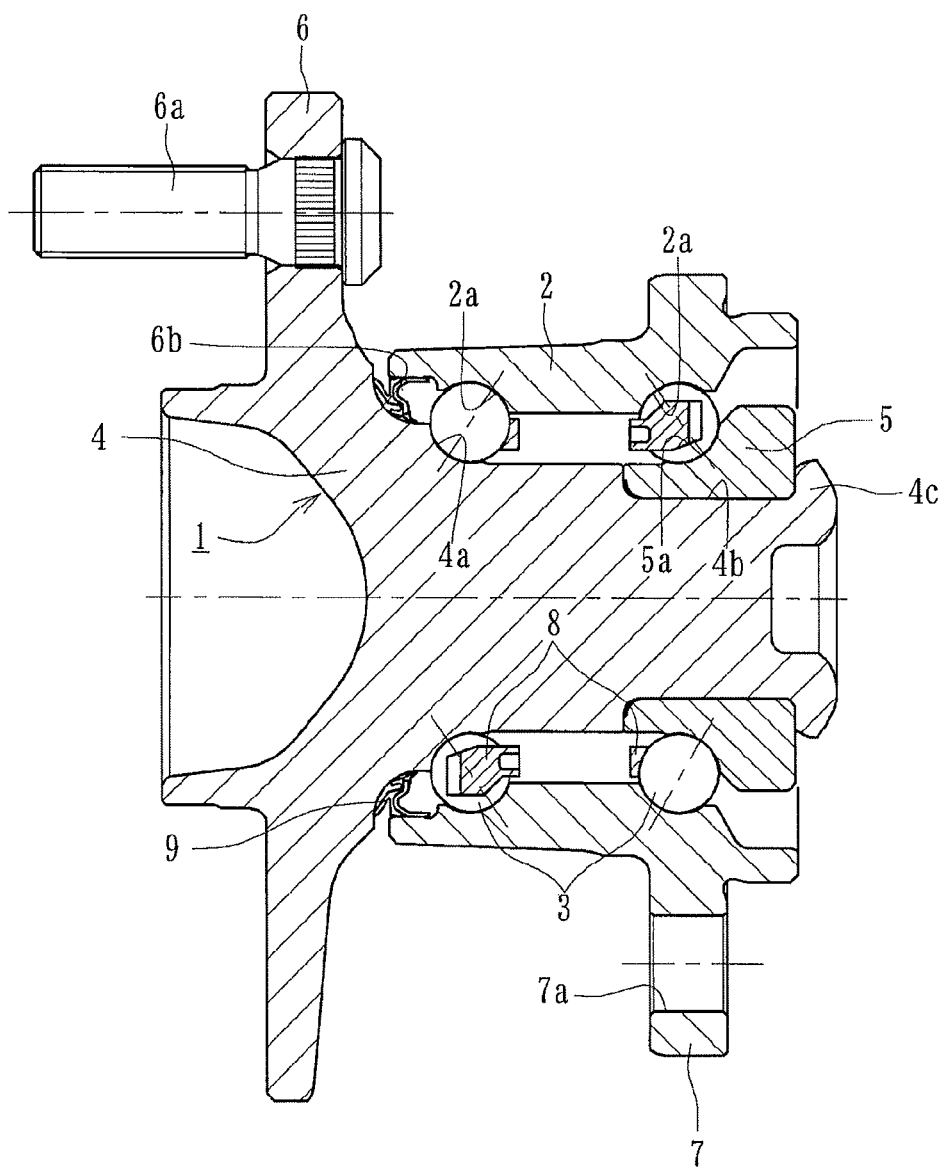
FIG. 1 is a longitudinal section view of a preferred embodiment of a wheel bearing apparatus.
Figure 2:
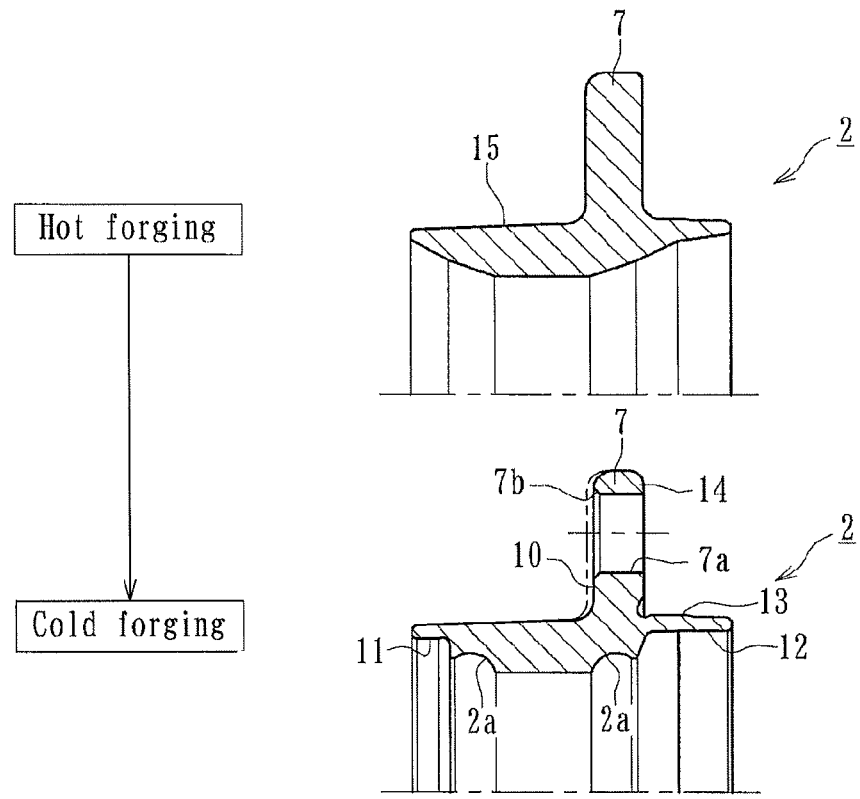
FIG. 2 is a longitudinal section view of a single unit of the outer member of FIG. 1.
Figure 3:
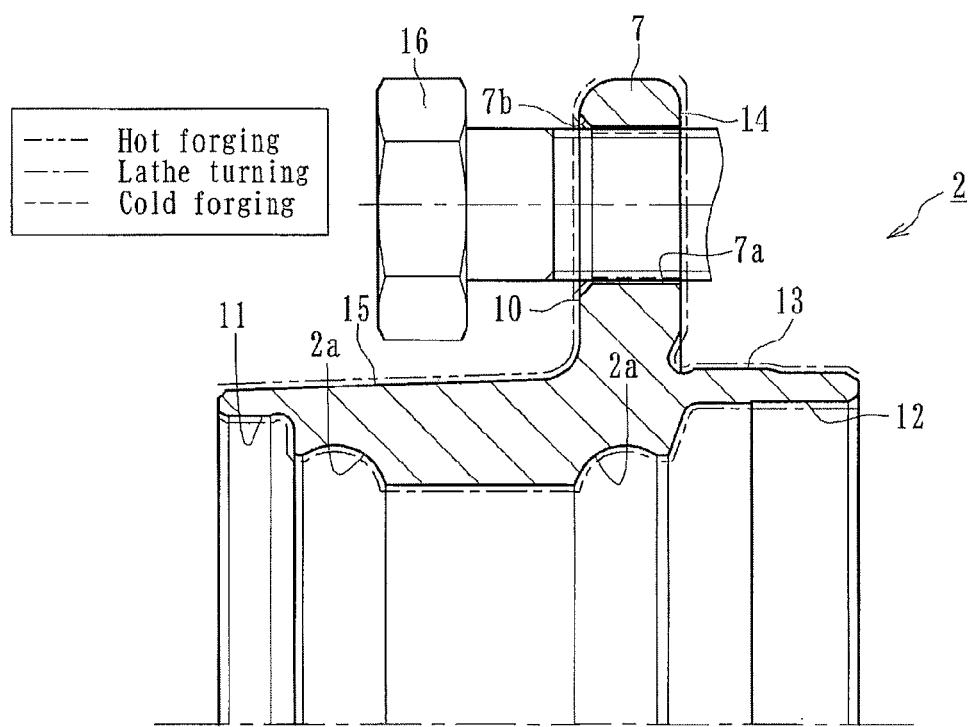
FIG. 3 is an explanatory view showing process steps of the outer member of FIG. 2.
Figure 4:
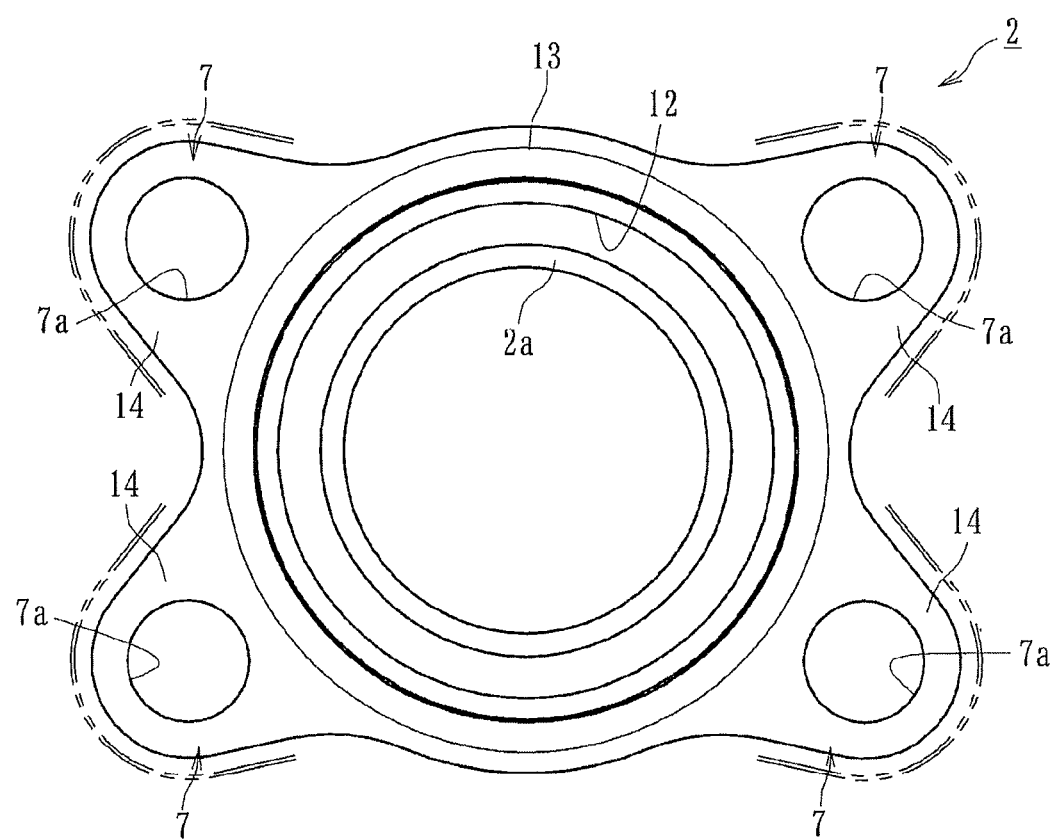
FIG. 4 is a side elevation view of the outer member of FIG. 2.
Figure 5:
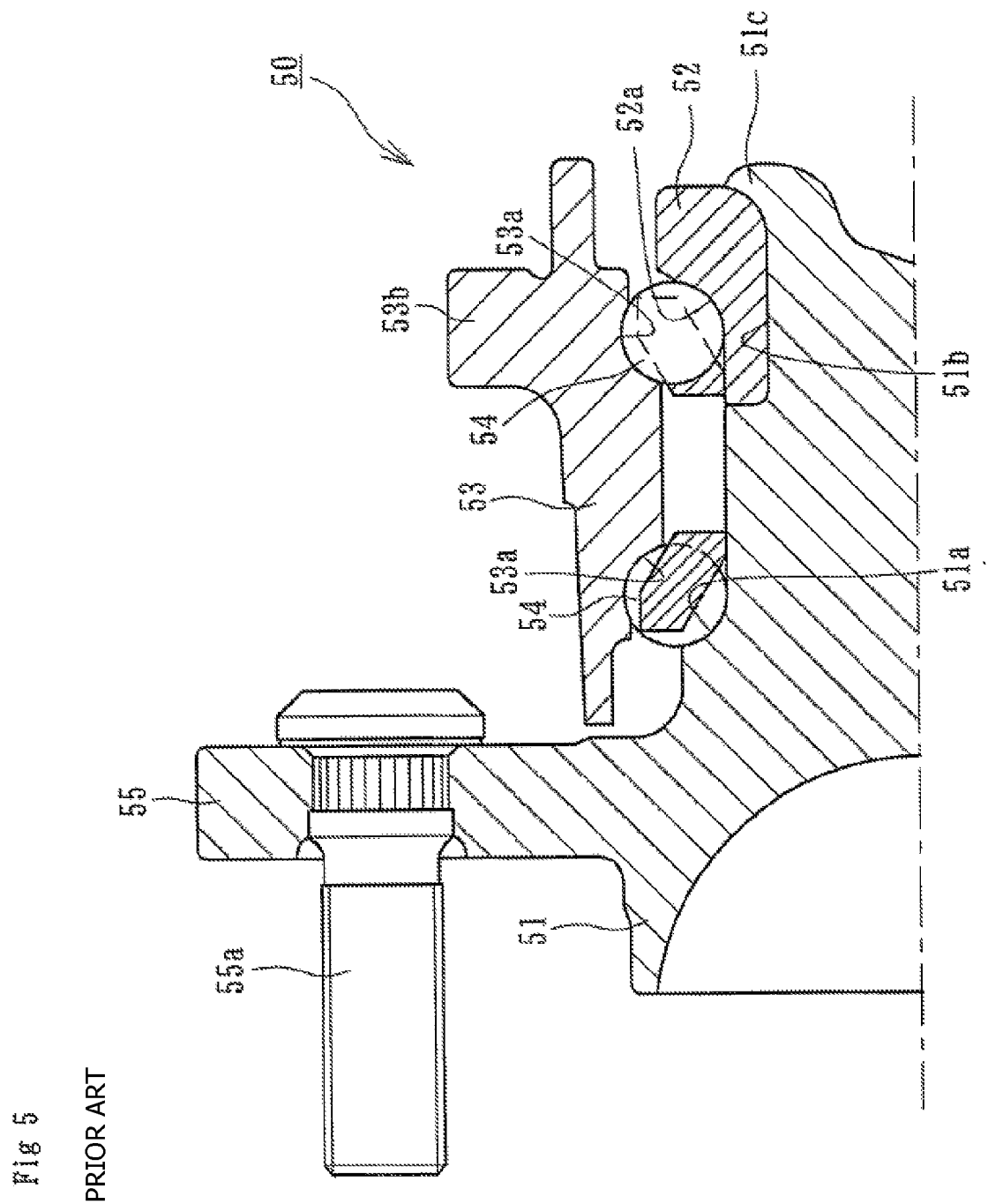
FIG. 5 is a longitudinal section view of a prior art wheel bearing apparatus.
Figure 6:
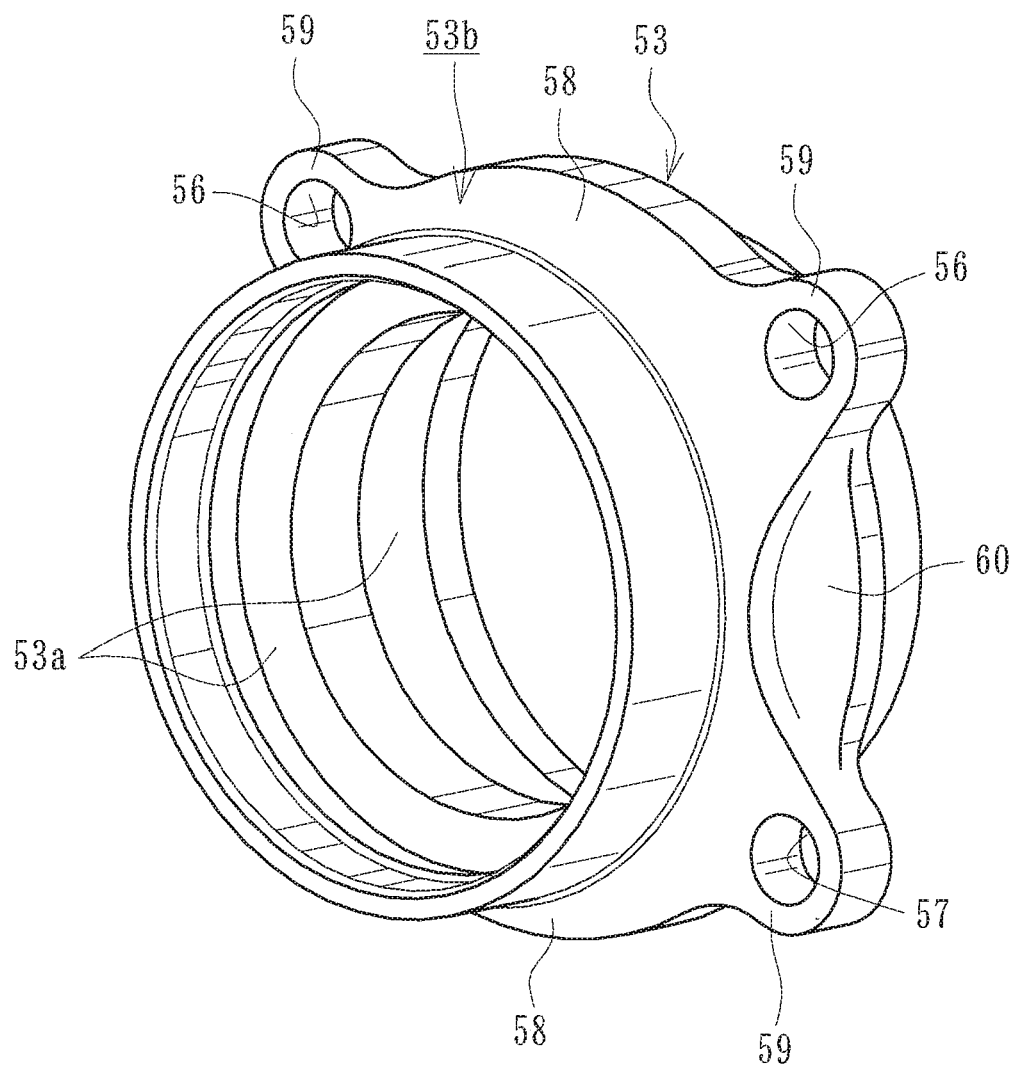
FIG. 6 is a perspective view of a single unit of the outer member of FIG. 5.
Figure 7:
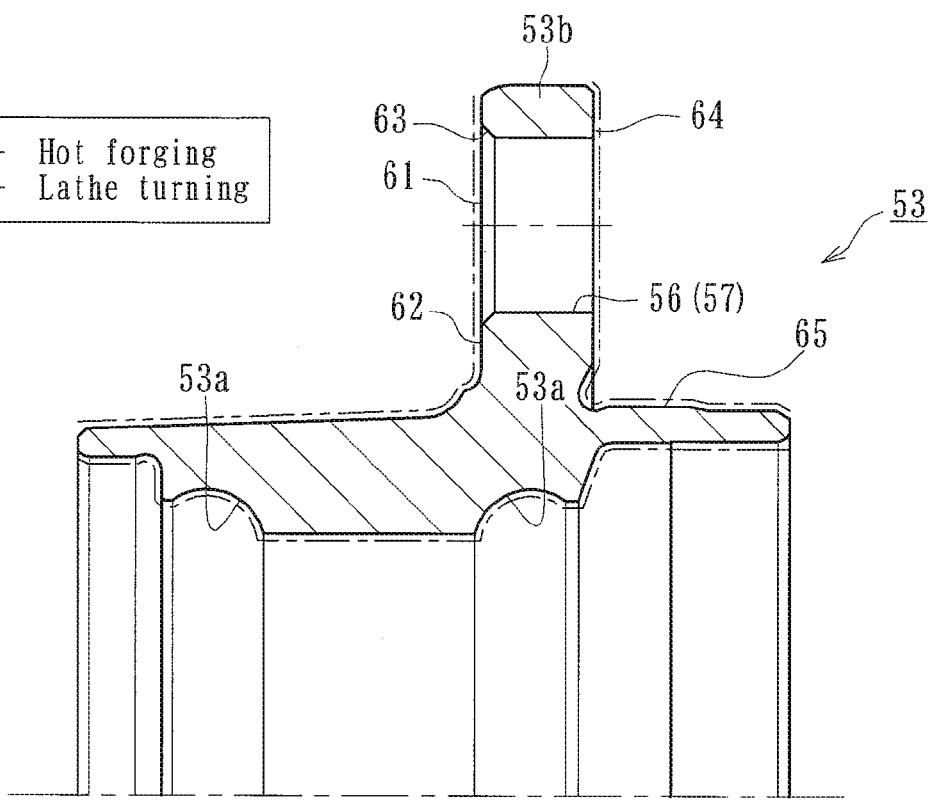
FIG. 7 is a longitudinal view of a single unit of the outer member of FIG. 5.
Figure 8:
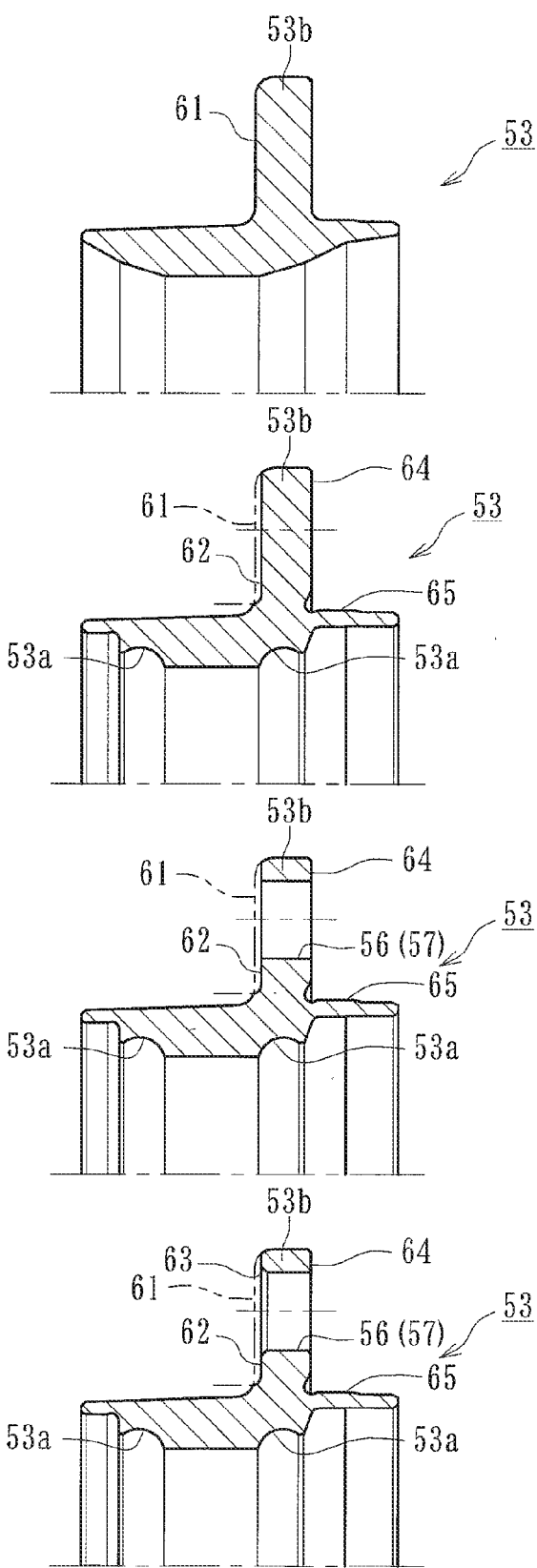
FIG. 8 is an explanatory view showing process steps of the outer member of FIG. 7.

FIG. 1 is a longitudinal section view of one preferred embodiment of a wheel bearing apparatus. FIG. 2 is a longitudinal section view of a single unit of the outer member of FIG. 1. FIG. 3 is an explanatory view illustrating processing steps of the outer member. FIG. 4 is a side elevation view of the outer member of FIG. 2. In descriptions of the present disclosure, the term "outboard-side" defines a side positioned outside of a vehicle body, the left side in drawings. The term "inboard-side" defines a side positioned inside of a vehicle body, the right side in drawings, when the wheel bearing apparatus is mounted on a vehicle body.

The wheel bearing apparatus shown in FIG. 1 is a so-called "third generation" type for a driven wheel. It includes an inner member 1, an outer member 2, and double row rolling elements (balls) 3, 3. The inner member 1 includes a wheel hub 4 and an inner ring 5 press-fit onto the wheel hub 4, via a predetermined interference.

The wheel hub 4 is integrally formed, on its outer-side end, with a wheel mounting flange 6 to mount a wheel (not shown). The wheel hub outer circumference includes one (outboard-side) inner raceway surface 4a. A cylindrical portion 4b axially extends from the inner raceway surface 4a. Hub bolts 6a are securely mounted on the wheel mounting flange 6 equidistantly along its periphery.

The inner ring 5 is formed, on its outer circumference, with the other (inboard-side) raceway surface 5a. The inner ring is press-fit onto the cylindrical portion 4b of the wheel hub 4. This forms a double row angular contact ball bearing of a back-to-back duplex type. The inner ring 5 is axially secured on the wheel hub 4, via a predetermined axial pre-stress of bearing, by plastically deforming an end of the cylindrical portion 4b. The inner ring 5 and rolling elements 3 are formed from high carbon chrome steel such as SUJ2. They are dip hardened to their cores to have a hardness of 58 to 64 HRC.

The wheel hub 4 is formed of medium-high carbon steel such as S53C including carbon of 0.40 to 0.80% by weight. It is hardened by high frequency induction hardening to have a surface hardness of 58 to 64 HRC over the inner raceway surface 4a and a region from an inboard-side base 6b of the wheel mounting flange 6 to the cylindrical portion 4b. The caulked portion 4c is maintained in a non-quenched condition to have its surface hardness after forging. This enables application of sufficient mechanical strength against rotary bending loads applied to the wheel mounting flange 6. Thus, this improves the anti-fretting property of the cylindrical portion 4b where the inner ring 5 is fit. Also, it enables the plastic deformation process to be performed on the caulked portion 4c without causing clacks.

The outer member 2 is integrally formed, on its outer circumference, with a body mounting flange 7. The body mounting flange 7 is to be mounted on a knuckle (not shown). The body mounting flange 7 is formed along its periphery with a plurality of bolt insertion bores 7a. Fastening bolts (not shown) are inserted into the bores 7A and fastened to the knuckle. The outer member inner circumference includes double row outer raceway surfaces 2a, 2a. The outer raceway surfaces 2a, 2a oppose the double row inner raceway surfaces 4a, 5a of the inner member 1. The double row rolling elements 3, 3 are rollably contained in an annular space between the inner raceway surfaces and the outer raceway surfaces, via cages 8, 8. A seal 9 and a cover (not shown) are mounted in annular openings formed between the outer member 2 and inner member 1 at both ends. The seal 9 and cover close and seal the annular openings in order to prevent leakage of lubricating grease contained with the bearing and entry of rain water or dust from the outside into the bearing.

The outer member 2 is formed of medium-high carbon steel such as S53C including carbon of 0.40 to 0.80% by weight. At least the double row outer raceway surfaces 2a, 2a are hardened, by high frequency induction hardening, to have a surface hardness of 58 to 64 HRC. Although it is shown as a wheel bearing apparatus with a double row angular contact ball bearing using balls as the rolling elements 3, the present disclosure is not limited. The bearing may be a double row tapered roller bearing using tapered rollers as the rolling elements. In addition, although it is shown as a third generation type of a driven wheel, the present application can be applied to the second and fourth generation types.

According to the present disclosure, the outer member 2 is formed, as shown in FIG. 2, so that the outermost contour surface of the body mounting flange 7 is previously hot forged. The outboard-side surface (bolt seating surface) 10, bolt insertion bores 7a and chamfered portions 7b are cold forged. The double row outer raceway surfaces 2a, 2a, the seal fitting surfaces 11, 12, a pilot portion 13 and the inboard-side surface 14 of the body mounting flange 7, to which the knuckle abuts, are formed by lathe turning.

Turning to FIG. 3, the outboard-side outer circumference surface 15 of the body mounting flange 7, of the outermost contour surface of the outer member 2, is formed as a forged skin condition shown by a two-dot chain line. The outboard-side surface (bolt seating surface) 10, the bolt insertion bores 7a and the chamfered portions 7b are formed as a cold forged skin condition, shown by a dotted line. In addition, the double row outer raceway surfaces 2a, 2a, the seal fitting surfaces 11, 12, a pilot portion 13 and the inboard-side surface 14 of the body mounting flange 7, that abuts the knuckle, are formed as a lathe turned skin condition shown by a dot-and-dash line.

The outboard-side surface (bolt seating surface) 10 of the body mounting flange 7, the bolt insertion bore 7a and chamfered portions 7b are formed by cold forging. Thus, this assures a desirable finishing accuracy. Furthermore, a lathe turning step on the outboard-side surface (bolt seating surface) 10 of the body mounting flange 7, a boring step of the bolt insertion bores 7a and a lathe turning step of the chamfered portions 7b can be eliminated. Thus, this provides a wheel bearing apparatus that improves blank yield and reduces manufacturing cost while reducing the number of processing steps.

The surface roughness of the outboard-side surface (bolt seating surface) 10 of the body mounting flange 7 is set to Ra 6.3 or less. This prevents the inclination of the fastening bolts 16 and improves the mounting accuracy. "Ra" is one of the coarseness shape parameters (JIS B0601-1994). It is expressed as an arithmetic average roughness which means an average value of an absolute value deviation from an average line.

A plurality (four bores in the illustrated embodiment) of bolt insertion bores 7a are simultaneously formed by cold forging. This occurs by using a boring jig under a condition where a supporting jig is positioned on the outermost contour of the body mounting flange 7, as shown in FIG. 4, when the bolt insertion bores 7a are formed by cold forging. This improves not only the dimensional accuracy of the bolt insertion bores but the accuracy of relative positions of the bolt insertion bores.

The present disclosure can be applied to wheel bearing apparatus of the second to fourth generations irrespective of those used for a driving wheel or for driven wheel.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising:
an outer member formed with a body mounting flange on its outer circumference, the body mounting flange is to be mounted on a knuckle, an inner circumference of the outer member includes double row outer raceway surfaces;
an inner member is formed with double row inner raceway surfaces on its outer circumference, the double row inner raceway surfaces oppose, respectively, one of the double row outer raceway surfaces;
double row rolling elements are freely rollably contained between the double row inner raceway surfaces and the outer raceway surfaces of the inner member and the outer member;
a plurality of bolt insertion bores, that fastening bolts are inserted into to fasten to the knuckle, are formed on the body mounting flange at a plurality of positions circumferentially along the body mounting flange, the outer circumference of the outer member has a hot forged skin;
a seating surface of the fastening bolts is formed on an outboard-side surface of the body mounting flange with the seating surface having a cold forged skin.

2. The wheel bearing apparatus of claim 1, wherein the bolt insertion bores of the body mounting flange have a cold forged skin.

3. The wheel bearing apparatus of claim 1, wherein a chamfered portion is formed on an outboard-side circumferential edge of each bolt insertion bore and the chamfered portions have a cold forged skin.

4. The wheel bearing apparatus of claim 1, wherein the surface roughness of the outboard-side surface of the body mounting flange is set to Ra 6.3 or less.

5. A method of manufacturing a wheel bearing apparatus comprising an outer member formed with a body mounting flange on its outer circumference, the body mounting flange to be mounted on a knuckle, an inner circumference of the outer member includes double row outer raceway surfaces; an inner member formed with double row inner raceway surfaces on its outer circumference, the double row inner raceway surfaces oppose, respectively, one of the double row outer raceway surfaces; double row rolling elements are freely rollably contained between the double row inner raceway surfaces and the outer raceway surfaces of the inner member and the outer member, the method comprises steps of:
forming a plurality of bolt insertion bores, that fastening bolts are inserted through to be fastened to the knuckle, on the body mounting flange at a plurality of positions circumferentially along the body mounting flange;
forming the outer circumference of the outer member by hot forging to form a hot forged skin;
forming a seat surface for the fastening bolts on an outboard side of the body mounting flange, wherein the seat surface and the plurality of bolt insertion bores are cold forged to form a cold forged skin on the seat surface and the plurality of bolt insertion bores.

6. The method for manufacturing a wheel bearing apparatus of claim 5 wherein the plurality of the bolt insertion bores are simultaneously formed by cold forging.

* * * * *